Dec. 15, 1942.     J. A. C. YULE     2,304,988
PHOTOMECHANICAL REPRODUCTION
Filed April 19, 1940     2 Sheets-Sheet 2
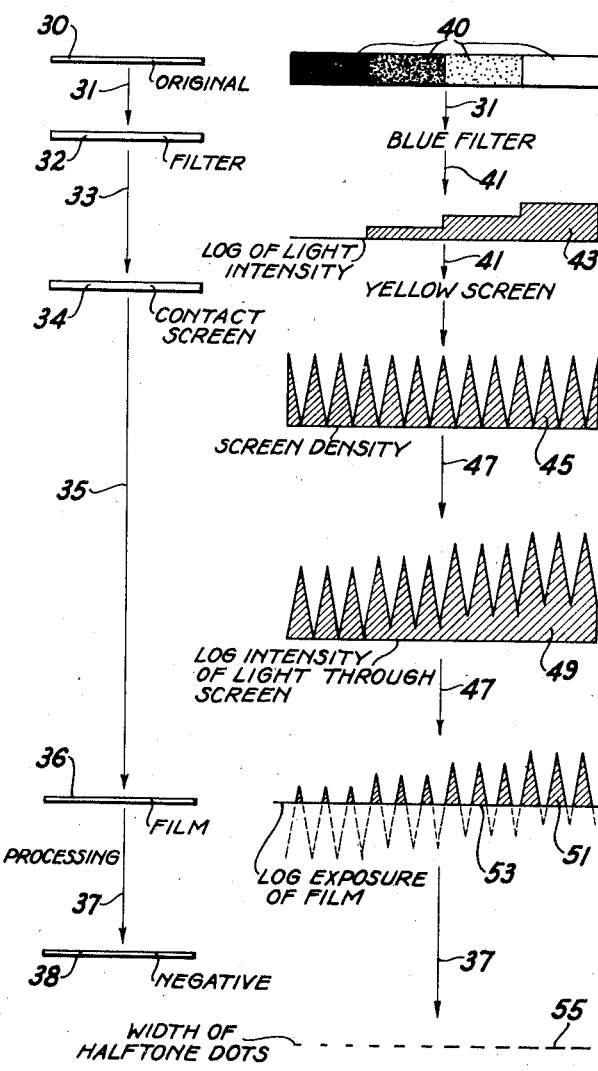
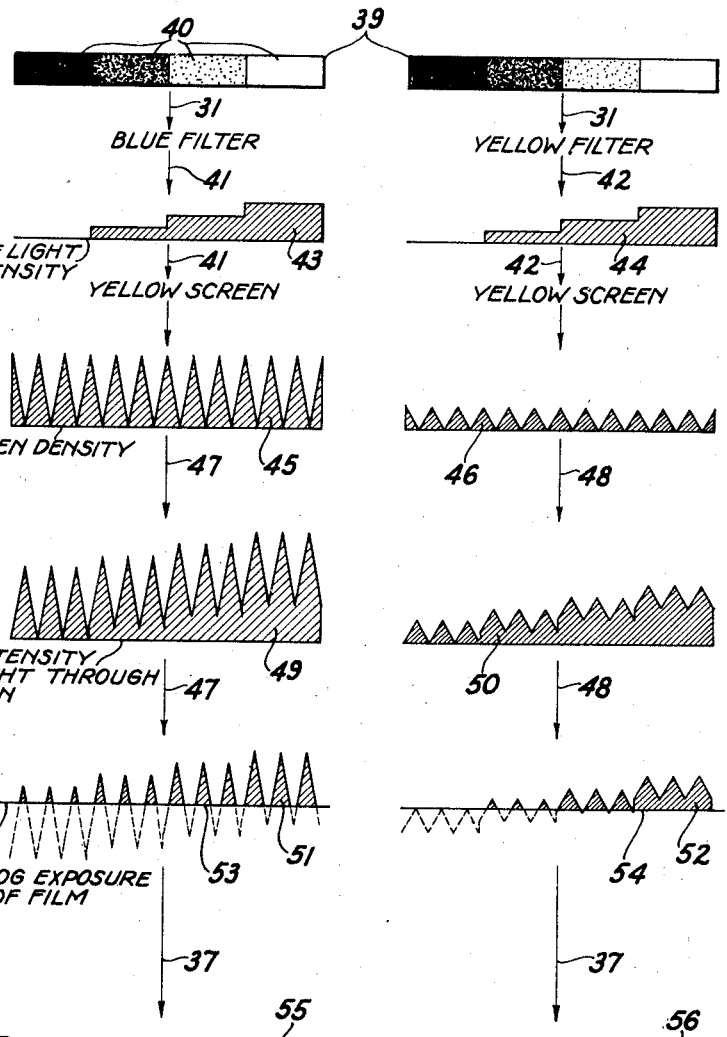
JOHN A.C. YULE
INVENTOR
BY *Newton M. Perrin*
ATTORNEY Patented Dec. 15, 1942

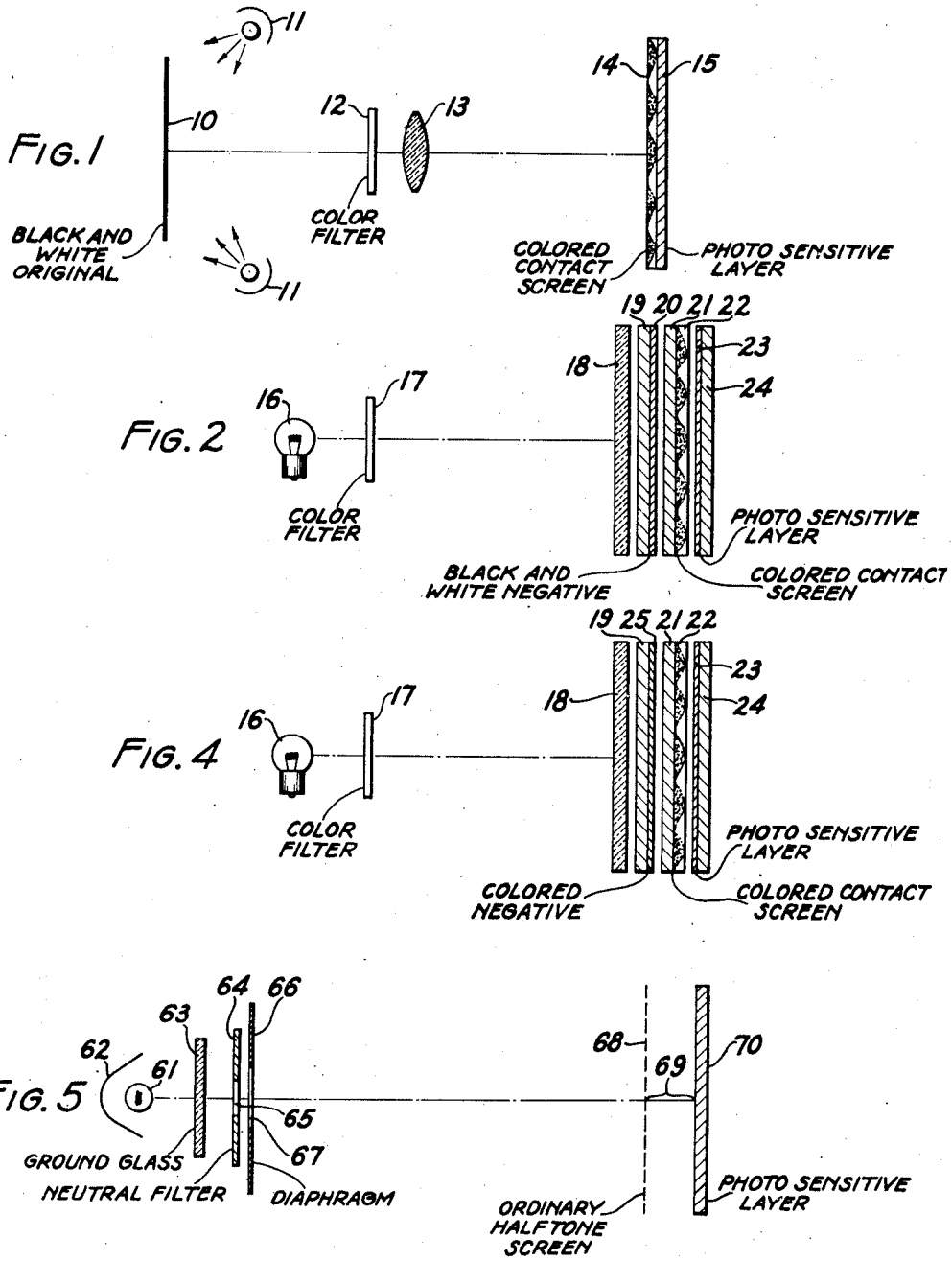

2,304,988

UNITED STATES PATENT OFFICE 2,304,988

PHOTOMECHANICAL REPRODUCTION

John A. C. Yule, Rochester, N. Y., assignor to Eastman Kodak Company, Rochester, N. Y., a corporation of New Jersey Application April 19, 1940, Serial No. 330,566

31 Claims. (Cl. 95—5)

This invention relates to photomechanical reproduction and particularly to halftone processes.

It is an object of the invention to provide a method of making fine-quality halftone negatives or positives having improved rendition of detail and sharp dots or elements.

It is an object of the invention to provide a process for producing such records with shorter exposures than are usually permissible.

It is the particular object of the invention to provide a method of producing a halftone record of any desired contrast substantially independent of the contrast of the original copy. That is, it is an object of the invention to provide a method having wider control of contrast than hitherto available, without the loss of sharpness entailed by the use of ordinary halftone screens and without the lack of highlight contrast also caused by ordinary screens.

As is well known every photo-mechanical process has a definitely limited range of densities in the final reproduction; that is, the highlights cannot be brighter than "zero" dot and the shadows cannot be darker than "solid" dot. It is because of this limited density range, that contrast must be controlled if the details of the original are all to be reproduced. If the original has a great density range, the reproduction process must include a low contrast to compress this range to match that of the reproduction. If the original has a small density range, it is customary to give increased contrast and to utilize the whole of the reproduction range.

The term "contrast" as commonly used has a variety of meanings. For example, one speaks of the contrast of an emulsion or of a negative produced therewith when speaking of the rate of change of density with exposure. That is, contrast is a comparison of the rate of change of density in a negative with the corresponding rate of change of density in the original subject. In a photographic print this relative contrast may refer back to the original itself or merely to the negative from which the print was made. In the specific case where relative contrast is in terms of the stage of the process immediately preceding the negative or print in question, and this contrast is measured only over the straight-line portion of the characteristic curve of the emulsion, this relative contrast is called gamma.

Another meaning of "contrast" is given in Cassel's Cyclopedia of Photography viz., the range of tones (densities in the image) between the highest light and the deepest shadow. This latter meaning is equivalent to maximum density range. Obviously, this meaning of contrast is not a relative one and is not the one usually thought of.

The present invention is useful in the control of contrast and thus controls relative contrast and maximum density range simultaneously. In most practical photomechanical processes, the operator is interested only in getting the correct range of exposures and utilizes contrast control for this purpose. Therefore, the present invention can be defined in terms of density range.

It is a specific object of the invention to provide a method of controlling the contrast of a halftone record when made with a contact screen such as described in copending application Serial Number 330,567 filed concurrently herewith by Alexander Murray.

In the history of the development of the halftone process there is very little mention of colored screens of any type. The present invention is concerned only with colored contact screens and while it may be applied with either diffusing screens such as pigmented gelatin or with transparent dye screens, I have found that when this invention is used with the latter type of screen, the results are far superior to anything previously obtainable with similar processes. The belief that the use of contact screens precluded any control of contrast has always been a major deterrent to any extended use of such screens. The present invention provides a method of making satisfactory halftone negatives or positives using colored halftone screens and a method of controlling the contrast produced therewith over a range even wider than with regular screens.

Contact halftone screens have, in each element, a graded density varying substantially continuously from clear in the corners to a maximum density at the centers. The screen elements may be of any form, such as lines, but are preferably in the usual dot formation. In the case of line screens the clear part of each element is usually referred to as the edge and the term corners is here used to include such edges of line screens. Of course, the density may vary in a large number of small finite steps or either the clear edge or the black center may extend over a minute area before the gradation starts, but always there is a more or less substantially continuous variation in density. I prefer to use the type of contact screens described in the above mentioned Murray application.

According to the present invention, a halftone record (negative or positive) is made from a continuous tone record by the following method. A colored contact screen is placed in contact with a sensitive layer such as a photographic film. The continuous tone record is placed in printing relation to the film, either in a contact printer or by having the film in a camera focused on the record. By filtering the light (either by having a color filter between the source of illumination and the continuous tone record or between the record and the film) the film is exposed to and by a colored optical image of the continuous tone record. The sensitive layer or film may then be developed to a high contrast (either to a positive or to a negative) by any suitable well-known process for developing halftone images.

The resulting halftone record has a highly improved sharpness of detail not available from either regular screens or black contact screens made up of a silver image. The shadow detail is also highly improved compared to prior process. All of these advantages which are obtained even if the continuous tone record is black and white and are further enhanced if the continuous tone record is colored either partially or completely. Thus in the preferred embodiment of the invention a colored continuous tone record is made as an intermediate step in the production of a halftone record. In the preferred embodiment just described in continuous tone record must be monochromous (i. e. not multi-colored) and if the original is multi-colored, the intermediate step of making a monochromous continuous tone record is a necessary one in this embodiment. The terms isochromous, monochromic, monochromous, and monochromatic originally had the same but indefinite meaning; monochromatic now refers to a single wave length. Monochromous is here selected to have the definite meaning:—of the same coloring material throughout. The coloring material may, of course, be made up of two or more ingredients. Also, although the hue is generally the same throughout it may change slightly as the density or tint is varied. For example, a magenta image is monochromous even though the hue in the lighter tints is sometimes more bluish than the hue in the darker regions of this magenta image.

One example described later in this specification employs a red screen with a magenta monochromous record. In the preferred embodiments of the invention, the light transmitting properties of the screen elements are of a type which affect all points of the record being copied equally (i. e. by a constant factor). Otherwise the contrast control would not be uniformly applied to all parts of the record. On the other hand, the contrast control would still be useful where proper tone rendition is not absolutely essential. Since the elements are adjacent to one another the screen may conveniently be thought of as made up of alternate light and dark elemental portions. Obviously, there are twice as many portions as there are whole elements.

Furthermore, and most important of all, this broad process using either black and white or colored originals permits a control of contrast greater than any hitherto available even with regular screens merely by changing the wave length of the light, i. e. the color of the optical image which exposes the film, i. e. by changing the filter used. If the filter and the screen have the same hue, the contrast of the resulting halftone record will be a maximum. The term contrast as just used may have any of the accepted meanings. For example, if the filter transmits a monochromatic light which is unaffected by the screen, the resulting record after processing would theoretically be just black and white with no intermediate tones, i. e. would have infinite relative contrast. In general the more the hue of the filter differs from that of the screen, the less is the contrast of the resulting halftone record. More exactly, the controlling factor is the apparent contrast of the screen in the light from the filter. The term contrast as applied to the screen refers generally to the density gradient from the corner to the center of each dot; any change in this contrast is measurable as the change in total density range, and hence, the term apparent contrast can be taken as meaning apparent density range. The more contrasty the screen appears in the light from the filter, the less is the contrast of the resulting halftone record. Actually there is a practical limitation on the maximum useful relative contrast available since, due to the fact that even halftone developers don't give infinite contrast, the sharpness of the dots decreases when the hue of the light approaches that of the screen. The contrast of the screen in the light from the filter must of course be that measured in terms of the sensitivity of the film used—not the visual contrast. The word "appears" means as it appears to the film; such phraseology is common in all branches of photography.

Thus, filters transmitting light only in the region complementary to the color of the screen all give approximately the same high contrast to the screen which results in a minimum contrast record having maximum sharpness of the individual dots. Incidentally, the invention may be practiced with screens which consist partly of a silver image and partly of a dye image, or with pigmented gelatin images, but it is preferable to have them entirely of a dye image so that the advantages of Murray's invention and the above-mentioned qualities of sharpness and detail resolution will be obtained.

According to the preferred embodiment of the invention mentioned above, the continuous tone record to be reproduced is also colored either by suitable toning and bleaching or by making a color print (positive or negative) thereof. In this embodiment there are various factors which affect the contrast of the resulting halftone record. There is of course the contrast of the negative being copied; it is to correct for incorrect contrast at this stage that the present invention was made. There are also the following four constant factors; at least they are constant once the materials and items have been chosen: (1) The spectral sensitivity of the emulsion (the sensitive layer), (2) the spectral distribution of intensity in the original illuminant, (3) the spectral transmission of the continuous tone record (the negative to be copied), and (4) the spectral transmission of the dye constituting the halftone screen. The single remaining factor: namely the spectral transmission of the filter serves to balance and select the relationship between these constant factors which gives the contrast and quality desired. An embodiment wherein the dot sharpness is constant and high, employs a screen of a color such as primary red or orange which includes only a narrow spectral region and the filters are varied from green to violet. A magenta, purple, violet, blue, green or yellow negative (or positive) is used. If a magenta negative is used, the change in filter color from green to violet is a change from the hue which is complementary to the negative color to a hue which is included in the negative color. In this case the change in contrast due to the change in apparent contrast (apparel density range) of the screen is relatively small so that the screen sharpness is unvaried, but there is a large change in contrast due to the ratio of filter color to negative color.

The invention will be fully understood from the following description when read in connection with the accompanying drawings in which:

Fig. 1 illustrates one embodiment of the invention.

Fig. 2 illustrates a similar embodiment of the invention.

Figs. 3A, 3B, and 3C demonstrate the change in image contrast with the change in the relationship between the filter color and the screen color, i. e. with apparent screen contrast.

Fig. 4 shows a preferred embodiment of the invention.

Fig. 5 shows one method of making a contact halftone screen to be used in the invention.

In Fig. 1 an original copy 10 is illuminated by sources of illumination 11 and is arranged in printing relation (through a lens 13) with a photosensitive layer 15 in front of which is placed a colored contact screen 14 carried by a suitable transparent support such as gelatin with or without a thin backing of cellulose nitrate or cellulose acetate. The optical image formed by the lens 13, of the original 10 on the sensitive layer 15 is colored by a filter 12 placed somewhere in the optical path between the layer 15 and the source of illumination 11, preferably adjacent to the lens 13 as shown.

A similar embodiment is shown in Fig. 2 wherein a point source of illumination 16 sends light through a filter 17 to expose a photosensitive layer 23 which is in contact with a colored contact screen 22 and is in printing relation to a negative 20. Supports 19, 21, and 24 support the negative, the contact screen and the photosensitive layer respectively and a glass plate 18 forms the support for all three films as is customary in contact printers. The record 10 in Fig. 1 or the record 20 in Fig. 2 may be either a positive or a negative and the photosensitive layers 15 and 23 may be developed directly or by reversal to give the same or the opposite type of record.

It is well known that the quality of a halftone positive made by direct printing from a halftone negative which was made from a continuous tone positive is different from that of a halftone positive made from a continuous tone negative, but the present invention is not concerned with these differences which can be compensated for by suitable selection of halftone screen.

It is perhaps a little difficult to understand offhand why the colored contact halftone screen gives less contrast to the resulting image when used in a light in which the screen appears most contrasty than it does when used in a light of the same hue as the screen itself. This is perhaps best explained by reference to Figs. 3A, 3B, and 3C, which form flow charts of the embodiment shown in Fig. 1 or 2. In Figs. 3A to 3C, an original record 30 is assumed to be in the form of a step tablet 39 having various densities 40 ranging from dark gray to white. Light from this original as indicated by arrows 31 passes through a filter 32 and forms a colored light beam indicated by the arrow 33. Actually this filter 32 may be before the original in the optical system or after it as shown in this flow chart. If a blue filter is used as shown in Fig. 3B, the light is colored blue as indicated by arrows 41 and the parts of the light beam coming from the steps 40 of the tablet have intensities indicated by the height of the blocks forming the shaded area 43. Similarly if a yellow filter is used the yellow light represented by arrows 42 has an intensity distribution represented by the area 44. The areas 43 and 44 are drawn identical, which indicates that the filter factors are compensated for, either by increasing the intensity of illumination or by increasing the exposure. The ordinates for the charts 43 and 44 are logarithmic and hence the base line is merely arbitrary and does not correspond to zero.

This colored light after passing through the filter strikes the colored contact screen 34. Forgetting for a moment the distribution of light due to the steps 40 of the original, the contact screen will have an apparent density range depending on its own color and the color of illumination. The apparent density range of a yellow screen in blue light is indicated by the sawtooth shaded area 45 and its apparent density range in yellow light is indicated by a saw-tooth shaded area 46. These density charts 45 and 46 illustrate very well the outstanding features of contact screens namely that the density is graded and varies substantially continuously from the center to the edges of the dots or elements of the screen. The charts are purely diagrammatic and of course a screen whose density range 46 in yellow light is one third of its density range 45 in blue light would hardly be called a yellow screen, but the exaggeration helps in illustrating the principle involved. Again the ordinates "density" are logarithmic but in this case the base line is approximately zero.

After passing through this contact screen 34 the light, represented by the arrow 35, has an intensity distribution which is affected both by the screen density and by the intensity distribution of the incident light as represented by the areas 43 and 44. In the case of the blue filter, the light transmitted by the yellow screen as represented by arrows 47 has an intensity distribution represented by the shaded area 49 which is both stepped and saw-toothed. This shaded area 49 is high where the shaded area 43 is high and is low where the screen density represented by the shaded area 45 is high. Similarly in the case of the yellow filter, the light from the screen as represented by arrows 48 has an intensity distribution represented by the shaded area 50. The base lines of the areas 49 and 50 are not the same as those of 43 and 44 but are respectively lower on the logarithmic ordinate scale by the maximum apparent densities 45 and 46 of the corresponding screens.

In any photographic process, it is a well-known fact that a certain minimum exposure is necessary before any effect is obtained on the film. It is customary to arrange the time or intensity of exposure so that the various brightnesses to be photographed are all included within the latitude of the sensitive film. That is, sufficient exposure is given so that the lowest intensities to be recorded give a very small density and the highest densities to be recorded, if possible, not overexposed. In the present case when the light 35 strikes a film 36 the time and intensity of exposure are arranged so that the resulting effect is indicated by the charts 51 or 52. That is, any intensity below the line 53 or 54 is insufficient to cause any exposure of the film and intensity above this line causes an exposure as indicated by the height of the shaded areas 51 and 52. For simplicity, the effect of the toe of the characteristic curve of the sensitive film is not included. Since this film is processed as indicated by the arrows 37 to a high contrast negative 38 in order to form a halftone record thereon, the only effect of the exposures indicated by the areas 51 and 52 is to give different widths to the halftone dots as indicated by the lines 55 and 56. The width of these halftone dots corresponds to the width of the intersection of the lines 53 and 54 with the saw-tooth 51 or 52 which correspond respectively to the shaded areas 49 and 50 with the base line taken at the inertia point of the sensitive film. The actual appearance (enlarged) of these halftone dots as viewed in plan is illustrated by the picture 57 in the case of the blue filter and by the picture 58 in the case of the yellow filter.

Either from the widths of the dots as shown by 55 and 56 or the areas of these dots as shown by 57 and 58, it is obvious that the contrast of the reproduction is much greater in the case of the yellow filter than in the case of the blue filter. In the picture 57, the dark gray step of the original 39 has a dot area greater than the minimum and the white step is not quite blocked out. On the other hand in the picture 58 the dark gray step gives the smallest possible dot formation and the white step is completely blocked out. Thus exposure of a film to a blue image through a yellow contact screen gives less contrast than exposure to a yellow image through the same yellow screen. Since the purpose of this contrast control is to compensate for low or high contrast in the continuous tone record to be reproduced, and since the resulting effect is opposite to the apparent contrast of the screen, the latter should be proportional to the contrast of the original record to give uniform results.

A preferred embodiment of the invention is shown in Fig. 4 which is made as nearly as possible identical with Fig. 2 so that only the pertinent difference appears. The difference is that the black-and-white negative 20 of Fig. 2 is replaced by a colored negative 25 shown in Fig. 4. Of course, it is immaterial whether this record is a negative or a positive except for the fact that screens with different density distribution in their elements must be used if the same quality is to be obtained. The use of a colored record introduces a new factor into the process without detracting in any way from any of the advantages of the broad idea. On the other hand, an additional phenomenon is available for controlling the contrast and it is possible to use this phenomenon along with that illustrated in Figs. 3A to 3C or to use either phenomenon separately. On the other hand, black and white (gray) may be considered to be one color and the general principles involved apply equally well to Figs. 2 and 4.

In both cases the dot sharpness at the screen positive depends on the contrast (density range) of the dots in the contact screen 22 and since the screen is colored, it also depends on the wave length of the illuminating light (i. e. on the color of the filter 17) and of course on the spectral sensitivity of the emulsion 23. The sensitivity of the emulsion is of course assumed to extend throughout whatever part of the visible spectrum is employed since obviously a film sensitive only to blue and ultra-violet would be indifferent to changes in a color filter from green to red. Incidentally if the filter varies from green to violet, orthochromatic film may be used even if the screen is red. The two phenomena acting in Fig. 4 can be illustrated separately by the following two extreme examples, but actually it is the ratio between the screen color, the negative color and the range of the filters which determines the contrast in practice.

As a first example we have taken the case wherein the contact screen 22 has a magenta color, i. e. a broad band color including red and blue and the negative 25 is a narrow band filter in this range, for example red. If the color filter 17 is varied from green to blue or violet (the photo-sensitive layer 23 being orthochromatic) the contrast of the negative 25 becomes lower relative to the contrast produced in the layer 23 by the screen 22, whereas the effect due to the relationship between the color of the filter 17 and the color of the screen 22 follows the phenomenon illustrated in Figs. 3A to 3C. That is, if the filter 17 is green, the magenta screen 22 bears the same relation to the color of the image formed on the sensitive film as that illustrated in Fig. 3B. If a violet filter is used at 17, the fact that the magenta screen 22 transmits violet easily results in a high contrast in the same way as the use of a yellow filter with a yellow screen as illustrated in Fig. 3C.

As an example restricted largely to the second phenomenon, the case is taken wherein the contact screen 22 is colored red and the negative 25 is magenta. Again the color of the filter 17 is varied from green to violet and an orthochromatic film is used. Since a red contact screen has practically the same apparent contrast (apparent density range) throughout the green and violet regions of the spectrum, there is very little effect due to the phenomenon shown in Figs. 3A to 3C. On the other hand the more the hue of the filter 17 differs from the hue of the negative 25, the higher is the contrast of the optical image exposing the film. Thus a low contrast is obtained when the filter 17 is violet and a high contrast is obtained when the filter is green. Intermediate wave lengths or successive exposures in suitable ratios with the two filters give intermediate contrasts (in either phenomenon). The lower the contrast of the magenta negative the longer must be the wave length of the filter color to give normal contrast results. In practice, normal contrast is the one which brings the whole exposure range within the density range available. This second example has the added advantage that regardless of the wave lengths used the resulting halftone dots will be equally sharp. I have found that much sharper detail is obtained than is possible with regular crossline screens. The use of a dye negative as well as a dye screen eliminates entirely the diffusion caused by a silver image in either of these layers. The control of contrast due to either phenomenon is far greater than that previously obtainable by specular and diffused illumination of silver images. Screen positives of normal quality can be made from any original regardless of its contrast. The process also results in accurate tone rendering whose quality is equal to that hitherto obtainable only by masking processes such as the Person process. The use of an anti-interference roughening of the surface (Murray application mentioned above) results in excellent quality in the shadows.

In the first example the filter is varied over or "ranges" the spectral absorption band of the negative. In the second example it ranges the absorption band of the screen. Both phenomena may be employed by allowing the filter to vary throughout the whole visible spectrum.

In any of the embodiments of the invention, the exposure may be partly through one filter and partly through a filter of a different color to control contrast more closely and conveniently. To obtain local control of contrast, dodging may be employed using a color filter instead of a mask or the dodging may be done with the usual mask while part of the exposure is being made through one filter and the rest of the exposure (without dodging) made through a filter of a different color.

Fig. 5 illustrates one method of making a contact screen such as 22 in Fig. 2 or 4. In this Fig. 5 a diffused source of illumination consisting of a lamp 61, a diffusing reflector 62 and a ground glass 63 (in practice it is preferable to use opal glass to insure complete diffusion) illuminates an aperture 67 which for convenience may be a small opening in a board 66 which is replacing the lens of a camera. In the film plane of the camera is placed a photosensitive layer 70 and an ordinary halftone screen 68 is placed a distance 69 in front thereof so that the shadow image of the screen 68 falling on the film 70 exposes it so that each element thereof receives a graded exposure varying substantially continuously from the center to the edge thereof. In order that the screen will not give too high shadow contrast when used with a continuous tone negative, the regular exposure through the aperture 67 may be supplemented by an exposure through a smaller aperture or preferably a neutral density 64 having a small aperture 65 therein is placed adjacent to the diaphragm 66 so that the aperture 65 is centrally located in the aperture 67. With this arrangement the exposure from the center of the aperture 67 is greater than that from the edges. Further details of this method of making a screen are given in the above mentioned Murray application.

After exposure the photosensitive layer 70 may be processed in any well-known manner to the desired color. For example if a magenta screen is desired, the layer 70 may be developed in any color forming developer containing a coupling developing agent and a magenta forming coupler. If a primary red screen is desired, the developer may contain equal amounts of a magenta forming coupler and a yellow forming coupler which are of equal activity. If one of the couplers is slightly more active than the other, this may be compensated for by increasing the amount of the other coupler. Developers containing substantially equal amounts of parabenzoylacetaminobenzene sulfonamide and 1-paranitrophenyl-3-methyl 5-pyrazolone form a satisfactory red screen. Although the present invention depends on the actual absorption curves of the dye or combination of dyes forming the color in the screen, it can be practiced with more or less success with practically any color.

Having thus described various embodiments of my invention I wish to point out that it is not limited to the specific arrangements shown but is of the scope of the appended claims.

What I claim and desire to secure by Letters Patent of the United States is:

1. In a photomechanical process the method of making a halftone record from a monochromous continuous tone record which comprises placing a photosensitive layer in contact with a contact halftone screen whose elements are colored and substantially continuously graded in density from the centers to the corners thereof, placing the continuous tone record in printing relation to the layer, illuminating the continuous tone record with light, selecting a color filter whose color differs from that of the screen elements in accordance with the contrast of the continuous tone record, filtering the light through said color filter before it reaches the layer whereby the layer is exposed through the screen to a colored image of the continuous tone record and developing the layer.

2. In a photomechanical process the method of making a halftone record from a continuous tone record which comprises forming a colored monochromous continuous tone record from the first-mentioned continuous tone record, placing a photosensitive layer in contact with a contact halftone screen whose elements are colored and substantially continuously graded in density from the centers to the corners thereof, placing the colored continuous tone record in printing relation to the sensitive layer, illuminating the colored continuous tone record with light, selecting a color filter whose color differs from that of the colored record and from that of the screen elements in accordance with the contrast of the colored record, filtering the light through said color filter before it reaches the layer whereby the layer is exposed through the screen to colored light from the colored continuous tone record and developing the layer.

3. The method according to claim 1 in which the halftone screen elements consist entirely of a transparent dye image and substantially colorless transparent means for supporting this image.

4. The method according to claim 2 in which the halftone screen elements consist entirely of a transparent dye image and transparent means for supporting this image and the colored continuous tone record also consists of a transparent dye image and transparent means for supporting this image.

5. In a photomechanical process the method of making a halftone record from a continuous tone record which comprises forming a monochromous colored continuous tone record from the first-mentioned continuous tone record, the color being one which has a broad spectral absorption band, placing a photosensitive layer in contact with a contact halftone screen whose elements are colored a color with a narrow spectral absorption band in said broad band and whose elements are substantially continuously graded in density from the centers to the corners thereof, placing the colored continuous tone record in printing relation to the sensitive layer, illuminating the colored continuous tone record with light, selecting with respect to the colors of the screen and monochromous record, a color filter in accordance with the contrast of the monochromous record, filtering said light through said color filter before it reaches the sensitive layer whereby the sensitive layer is exposed by an image of the continuous tone record which image is colored by the colored continuous tone record and the filter and developing the layer.

6. In a photomechanical process the method of making a halftone record from a continuous tone record which comprises forming a monochromous colored continuous tone record from the first-mentioned continuous tone record, the color being one which has a narrow spectral absorption band, placing a photosensitive layer in contact with a contact halftone screen whose elements are colored a color having a broad spectral absorption band which includes said narrow band and whose elements are substantially continuously graded in density from the centers to the corners thereof, placing the colored continuous tone record in printing relation to the sensitive layer, illuminating the colored continuous tone record with light, selecting with respect to the colors of the screen and monochromous record, a color filter in accordance with the contrast of the monochromous record, filtering said light through said color filter before it reaches the sensitive layer whereby the sensitive layer is exposed by an image of the continuous tone record which image is colored by the colored continuous tone record and the filter, and developing the layer.

7. In a photomechanical process the method of making a halftone record from a continuous tone record which comprises forming a magenta continuous tone record from the first-mentioned continuous tone record, placing a photosensitive layer in contact with a contact halftone screen whose elements are red and are substantially continuously graded in density from the centers to the edges thereof, placing the magenta record in printing relation to the sensitive layer, illuminating the magenta record with light, selecting with respect to the colors of the screen and monochromous record, a color filter in accordance with the contrast of the monochromous record, filtering said light through said color filter before it reaches the sensitive layer whereby the sensitive layer is exposed by an image of the magenta record which image is colored by the magenta record and the filter and developing the layer.

8. In a photomechanical process the method of making a halftone record from a continuous tone record which comprises forming a monochromous colored continuous tone record from the first-mentioned continuous tone record, the color being one which has a narrow spectral absorption band, placing a photosensitive layer in contact with a contact halftone screen whose elements are colored a color having a broad spectral absorption band which includes said narrow band and whose elements are substantially continuously graded in density from the centers to the corners thereof, placing the colored continuous tone record in printing relation to the sensitive layer, illuminating the colored continuous tone record with light, selecting in accordance with the color and the contrast of the monochromous record a color filter which transmits light only in said broad absorption band, filtering said light through said color filter before it reaches the sensitive layer whereby the sensitive layer is exposed by an image of the continuous tone record which image is colored by the colored continuous tone record and the filter and developing the layer.

9. In a photomechanical process the method of making a halftone record from a continuous tone record which comprises forming a magenta continuous tone record from the first-mentioned continuous tone record, placing a photosensitive layer in contact with a contact halftone screen whose elements are red and whose elements are substantially continuously graded in density from the centers to the edges thereof, placing the magenta record in printing relation to the sensitive layer on the same side of this layer as is the contact halftone screen, illuminating the magenta record with light to expose the sensitive layer, selecting in accordance with the contrast of the magenta record a color filter which transmits a relatively narrow spectral region not including red, filtering said light through said color filter before it reaches the sensitive layer whereby the sensitive layer is exposed by an image of the magenta record which image is colored by the magenta record and the filter and developing the layer.

10. The method according to claim 1 in which the color of said colored image is such that the apparent density range of the contact screen is proportional to the contrast of the continuous tone record.

11. The method according to claim 2 in which the color of the color filter is such that the ratio of the apparent density range of the contact screen to the relative contrast of said colored continuous tone record is proportional to the contrast of the first mentioned continuous tone record.

12. The method according to claim 5 in which the color of the color filter is such that the ratio of the apparent density range of the contact screen to the relative contrast of said colored continuous tone record is proportional to the contrast of the first mentioned continuous tone record.

13. The method according to claim 6 in which the color of the color filter is such that the ratio of the apparent density range of the contact screen to the relative contrast of said colored continuous tone record is proportional to the contrast of the first mentioned continuous tone record.

14. The method according to claim 7 in which the color of the color filter is such that the ratio of the apparent density range of the red screen to the relative contrast of the magenta record is proportional to the contrast of the continuous tone record.

15. The method according to claim 8 in which the color of the color filter is such that the ratio of the apparent density range of the contact screen to the apparent relative contrast of said colored continuous tone record is proportional to the contrast of the first mentioned continuous tone record.

16. The method according to claim 9 in which the wave length of the light transmitted by the filter is inversely proportional to the contrast of the magenta record.

17. In processes for the photo-reproduction of a continuous tone record, the method of controlling contrast which comprises placing in printing relation to the record a photo-sensitive layer in contact with the surface of which, which surface faces the record, is a screen consisting of juxtaposed elemental portions and having an apparent contrast which varies with the quality of the light incident thereon, selecting light filter means whose light-transmission properties with respect to the screen are such that the apparent contrast of the screen is proportional to the contrast of the continuous tone record, exposing the photosensitive layer by light from the continuous tone record, filtering said light by said filter during said exposing and developing the layer.

18. The method according to claim 17 in which the elemental portions of the screen are continuously graded in light-transmission properties from the center of each portion to the center of the adjacent portion whereby the developed layer always contains a halftone image.

19. In processes for the photo-reproduction of a monochromous continuous tone record, the method according to claim 17 in which the screen is a colored screen and the filter is a color filter.

20. In processes for the photo-reproduction of a monochromous continuous tone record, the method according to claim 17 in which the screen is a monochromous colored screen of a different color from the record and the filter is a color filter whose color differs from both the screen and the record.

21. In processes for the photo-reproduction of a monochromous continuous tone record, the method according to claim 17 in which the screen is a colored screen with the elemental portions thereof continuously graded in density from the center of each portion to the center of the adjacent portion, and the filter is a color filter whose color differs from both the screen and the record.

22. In a photo-mechanical process, the method of making a halftone record from, and including the total density range of, a monochromous continuous tone record which comprises placing a photosensitive layer in contact with a contact halftone screen whose elements are colored and substantially continuously graded in density from the centers to the corners thereof, placing a continuous tone record in printing relation to the layer and on the same side of the layer as is the screen, illuminating the continuous tone record with light to expose the layer, selecting a color filter whose color differs from that of the screen elements and from that of the record in accordance with the total density range of the record, filtering the light through said color filter before it reaches the layer whereby the layer is exposed through the screen to a colored image of the continuous tone record and developing the layer.

23. In the photo-mechanical process, the method of making a halftone record from a continuous tone record, which comprises forming a colored monochromous continuous tone record from, and including the total density range of, the first-mentioned continuous tone record, placing a photo-sensitive layer in contact with a contact halftone screen whose elements are colored and substantially continuously graded in density from the centers to the corners thereof, placing the colored continuous tone record in printing relation to the sensitive layer and on the same side of the layer as is the screen, illuminating the colored continuous tone record with light to expose the layer, selecting a color filter whose color differs from that of the screen elements and from that of the colored record in accordance with the total density range of the colored record, filtering the light through said color filter before it reaches the layer and developing the layer.

24. The method according to claim 22 in which the color of said colored image is such that the apparent density range of the contact screen is proportional to the total density range of the continuous tone record.

25. The method according to claim 23 in which the color of the color filter is such that the apparent density range of the contact screen is proportional to the total density range of the colored continuous tone record.

26. The method according to claim 5 in which the color of the color filter is such that the apparent density range of the contact screen is proportional to the total density range of said colored record.

27. The method according to claim 6 in which the color of the color filter is such that the apparent density range of the contact screen is proportional to the total density range of said colored record.

28. The method according to claim 7 in which the color of the color filter is such that the apparent density range of the red screen is proportional to the total density range of the magenta record.

29. The method according to claim 8 in which the color of the color filter is such that the apparent density range of the contact screen is proportional to the total density range of said colored record.

30. The method according to claim 9 in which the wavelength of the light transmitted by the filter is inversely proportional to the total density range of the magenta record.

31. A method according to claim 17 in which the screen is non-selective with respect to the continuous tone record.

JOHN A. C. YULE.